United States Patent Office 3,501,509
Patented Mar. 17, 1970

3,501,509
13-ALKYLGONA-1,3,5(10)-TRIENE-17-ONE INTERMEDIATES AND PROCESS
Chan H. Kuo, South Plainfield, David Taub, Metuchen, and Norman L. Wendler, Summit, N.J., assignors to Merck & Co., Inc., Rahway, N.J., a corporation of New Jersey
No Drawing. Filed Feb. 24, 1966, Ser. No. 529,624
Int. Cl. C07c *167/02, 167/12, 169/08*
U.S. Cl. 260—397.5
2 Claims

ABSTRACT OF THE DISCLOSURE

The invention disclosed herein relates to novel intermediate compounds useful in preparing steroid compounds of the estrane series which have utility as intermediates in the preparation of optically active estrone, estradiol and other 3-hydroxy or substituted oxy-13-lower alkyl-gona-1,3,5(10)-trien-17-one steroids which are physiologically active substances possessing estrogenic activity, and to novel intermediate compounds which are useful in the total synthesis of optically active steroids, and to methods for the preparation of these novel intermediates by reducing 3-oxy-13-alkyl-8(14)-secogna-1,3,5(10),9 (11),15-pentaene-14,17-dione [obtained by condensation of 2-alkyl-4-acyloxy-cyclopentane-1,3-dione and 1-vinyl-1-hydroxy-6-oxy-1,2,3,4,-tetrahydronapthalene] to the racemic 17α-hydroxy derivative, followed by resolution of the racemate and hydrogenation of the resulting d- and l-isomers, the action of the latter with an acid thereby closing the C-ring to form d- and l-isomers of 3-oxy-13-alkyl-1,3,5(10),8,14-pentaene-17α-ol, electively reducing the Δ¹⁴ double bond by catalytic hydrogenation, and the Δ⁸ by sodium or potassium in liquid ammonia, followed by sodium chromate oxydation of the 17α-hydroxy to form the desired d- and l-isomers of 3-oxy-13-alkylgona-1-3, 5(10)-triene-17-one.

More particularly, this invention relates to the racemic form and the optically active d- and l-isomers of 3-hydroxy and substituted oxy-13-lower alkyl-8(14)-secogona-1,3,5(10), 9(11)-tetraen-14-one-17α-ol and 17α-acyloxy compounds and the racemic form and the optically active d- and l-isomers of the corresponding compounds having a double bond between the 15 and 16 carbon atoms; the racemic form and the optically active d- and l-isomers of 3-hydroxy and substituted oxy-13-lower alkylgona-1,3,5 (10),8,14-pentaen-17α-ol and 17α-acyloxy compounds; the racemic form and the optically active d- and l-isomers of 3-hydroxy and substituted oxy-13-lower alkylgona-1,3, 5(10),8-tetraen-17α-ol and 17α-acyloxy compounds; and the racemic form and the optically active d- and l-isomers of 3-hydroxy and substituted oxy-13-lower alkylgona-1,3, 5(10)-trien-17α-ol and 17α-acyloxy compounds.

The novel synthesis of this invention may be chemically represented as follows: Wherein R₁ is hydrogen, a lower cycloaliphatic radical or a straight or branch-chained lower alkyl radical, preferably having not more than five carbon atoms, an aryl, or a heterocyclic radical, such as a tetrahydropyranyl radical; R₂ is a lower alkyl radical, preferably having not more than five carbon atoms; and R₃ is hydrogen or a lower acyl radical, preferably having not more than five carbon atoms.

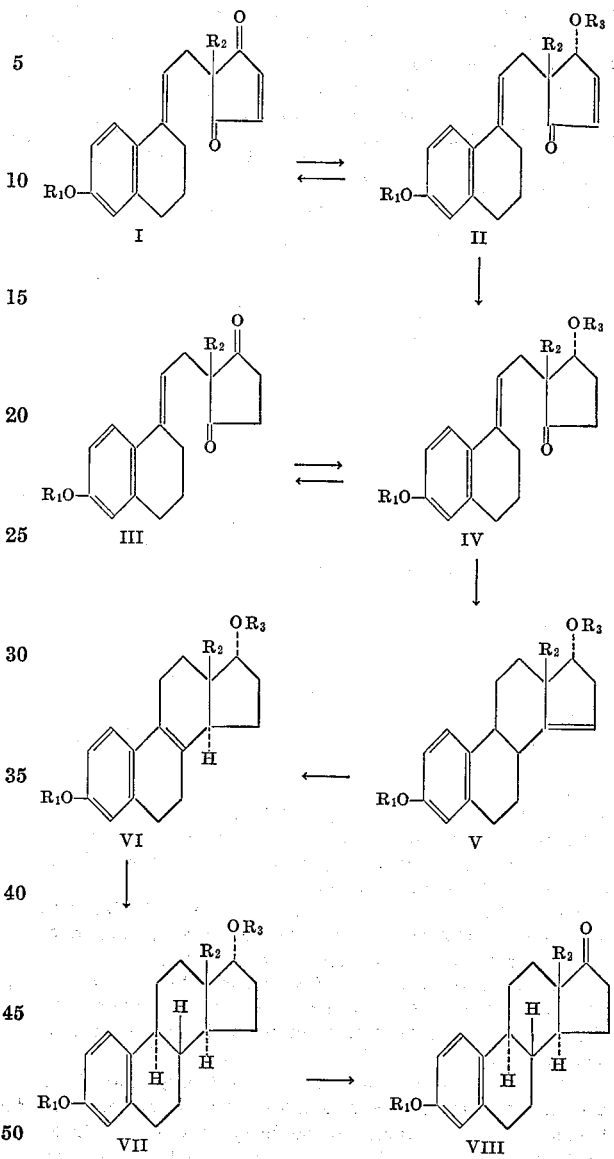

The starting material for the synthesis of this invention is a 3-hydroxy or substituted oxy-13-lower alkyl-8(14)-secogna-1,3,5(10),9(11),15-pentaene - 14,17 - dione (Compound I), or a 3-hydroxy or substituted oxy-13 - lower alkyl-8(14)-secogona-1,3,5(10),9(11)-tetraene-14,17-dione (Compound III). Compound I may be prepared by the reaction of a 2-lower alkyl-4-lower acyloxy cyclopentane-1,3-dione with a 1-vinyl-1-hydroxy-6-hydroxy or substituted oxy-1,2,3,4-tetrahydronaphthalene. The 2-lower alkyl-4-lower acyloxy cyclopentane-1,3-dione compounds may be prepared by acylating a 2-lower alkyl- 4-hydroxycyclopentane-1,3-dione with a lower aliphatic acid anhydride.

The synthesis of this invention begins with the reduction of Compound I to provide racemic 3-hydroxy or substituted oxy-13-lower alkyl-8(14)-secogona-1,3,5(10),9-(11),15-ptenaen-14-one-17α-ol (Compound II) or the reduction of Compound III to provide racemic 3-hydroxy or substituted oxy-13-lower alkyl-8(14)-secogona-1,3,5(10),9(11)-tetraen-14-one-17α-ol (Compound IV).

Compounds II and IV may be resolved to provide the optically active d- and l-isomers of Compounds II and IV. The racemic form or the optically active d- and l-isomers of Compounds II and IV, in which a substituted oxy group is present on the 3-carbon atom, may be acylated to provide the corresponding 17α-acyloxy derivatives. The 17-acyloxy derivatives of racemic Compounds II and IV may also be resolved.

The racemic form of Compound II or the optically active d- and l-isomers of Compound II, which may have a 17α-acyloxy group, may be hydrogenated to provide the racemic form of Compound IV or the d- and l-isomers of Compound IV.

In the next step, the C-ring of the racemic form or the optically active d- and l-isomers of a 3-hydroxy or substituted oxy - 13-alkylgona - 1,3,5(10),9(11)-tetraen-17α-ol or a 3-substituted oxy-13-lower alkyl-17α-acyloxy-gona-1,3,5(10),9(11)-tetraene is closed to provide the racemic form or the optically active d- and l-isomers of a 3-hydroxy or substituted oxy-13-lower alkylgona-1,3,5 (10),8,14-pentaen-17α-ol or a 3-substituted oxy-13-lower alkyl-17α-acyloxygona - 1,3,5(10),8,14 - pentaene (Compound V).

The Δ¹⁴-bond of Compound V is reduced in the next step to provide the racemic form or the optically active d- and l-isomers of a 3-hydroxy or substituted oxy-13-lower alkylgona-1,3,5(10),8-tetraen-17α-ol or a 3-substituted oxy-13-lower alkyl-17α-acyloxygona-1,3,5(10),8,14-pentaene having a hydrogen atom on the C-14 carbon atom in the alpha position (Compound VI).

In the next step, the Δ⁸-bond of Compound VI is reduced to provide the racemic form or the optically active d- and l-isomers of a 3-hydroxy or substituted oxy-13-lower alkylgona-1,3,5(10)-trien-17α-ol steroid having a hydrogen atom on the C-8 carbon atom in the beta position and hydrogen atoms on the C-9 and C-14 carbon atoms in the alpha position (Compound VII).

In the final step, the 17α-hydroxy group of Compound VII is oxidized to a ketto group to provide the racemic form or the optically active d- and l-isomers of a 3-substituted oxy - 13 - lower alkylgona-1,3,5(10)-trien-17-one compound (Compound VIII).

The racemic form of any of Compounds V, VI, and VII may be resolved to provide the optically active d- and l-isomers of Compounds V, VI and VII.

The 17α-acyloxy group of a racemic form or of an optically active d- or l-isomer of any of Compounds II, IV, V or VI may be converted by hydrolysis to a 17α-hydroxy group.

The reduction of Compound I or Compound III is accomplished by the use of a lithium tri-alkoxyaluminum hydride, such as lithium tri-methoxyaluminum hydride, or lithium tri-tertiary-butoxyaluminum hydride, the latter reducing agent being preferred, to provide racemic 3-hydroxy or substituted oxy-13-lower alkyl-8(14)-secogona - 1,3,5(10),9-(11),15-pentaen-14-one-17α-ol (Compound II), or racemic 3-hydroxy or substituted oxy-13-lower alkyl - 8(14)-secogona-1,3,5(10),9(11)-tetraen-14-one-17α-ol (Compound IV).

Reduction of Compound I or Compound III with a lithium tri-alkoxyaluminum hydride reducing agent to provide Compound II or Compound IV may be conveniently accomplished by adding a solution of Compound I or Compound III in an inert organic solvent, such as tetrahydrofuran, to a solution of the reducing agent in a suitable solvent, such as ether, bis-2-methoxyethyl ether, or tetrahydrofuran, and stirring the reaction mixture at room temperature until the reaction is complete. Compound II or Compound IV may be conveniently isolated from the reaction mixture by adding saturated aqueous sodium sulfate solution, filtering, washing the inorganic salt with water and ether and extracting the filtrate with ether, benzene, ethyl acetate, or other suitable solvent. The extract is separated, washed with saturated aqueous sodium chloride solution, dried over sodium sulfate and concentrated to dryness by distillation under reduced pressure. The residue of crude Compound II or Compound IV may be purified by chromatographing a solution thereof on magnesium silicate or silica gel in a suitable developing solvent, such as a 40-1 mixture of chloroform and methanol. Compound II or Compound IV may be obtained by elution of the chromatogram with a suitable solvent, such as 1–1 mixture of acetone and methanol.

Each of Compounds II and IV, which has a substituted oxy group on the 3-carbon atom may be acylated to provide the corresponding 17a-acyloxy compound by keeping at room temperature for a period of time from 12 to 24 hours, a solution of the compound to be acylated in pyridine containing an acid anhydride, preferably an anhydride of a mono-basic lower aliphatic acid, such as acetic anhydride or propionic acid anhydride. The 17α-acyloxy steroid may be isolated from the reaction mixture by removing the solvents under reduced pressure, dissolving the mixture in ether, washing the ether solution with dilute aqueous potassium bicarbonate solution, then with saturated aqueous sodium chloride solution, drying the washed soltuion over magnesium sulfate, filtering, and concentrating to dryness. The residue is the 17α-acyloxy steroid.

Either of Compounds II or IV may be resolved by forming a diastereoisomeric ester by any of several methods, such as by forming an ester of Compound II or IV which has a 17α-hydroxy group with an optically active acid or forming an ester with a dibasic organic acid and forming a salt of the ester with an optically active alkaloid base, followed by separating the optically active diastereoisomers and regenerating the steroid. Compounds II and IV or the 17α-acylates thereof may also be resolved by forming a d- or l-menthydrazone or a 4-(4-carboxyphenyl)-semicarbazone thereof and forming a salt of the semicarbazone with an optically active alkaloid base, followed by separating the optically active diastereoisomers and regenerating the optically active forms of the compound which was resolved.

Resolution of Compounds II or IV by forming a diastereoisomeric ester with an optically active acid may be accomplished by reacting the compound to be resolved with a suitable optically active acid chloride or acid anhydride, the preferred compound for use in forming an ester being optically active menthoxyacetyl chloride. The optically active acid chloride or anhydride of bornyloxy-acetic acid may also be used. In forming a diastereoisomeric ester with an optically active menthoxyacetyl chloride, the latter compound is added to a solution in anhydrous pyridine of an equi-molar amount of the compound to be resolved and the mixture is allowed to stand overnight under nitrogen. The major amount of the pyridine is removed by distillation and the residue is poured into water. The precipitate formed is removed by filtration and the filtrate is extracted with a suitable solvent, such as ether or benzene. The extract is added to a solution of the precipitate in the same solvent and the combined solution is washed with dilute aqueous hydrochloric acid, dilute aqueous sodium hydroxide solution, and then with water. The solvent is removed from the solution by distillation under reduced pressure. The diastereoisomeric ester may be resolved by fractional crystallization from a suitable solvent, such as methanol. The separated d- and l-diastereoisomeric esters obtained by fractional recrystallization may be hydrolyzed by treating with dilute ethanolic potassium hydroxide solution in slight excess. After hydrolysis is complete, the optically active steroid may be recovered by extraction with a suitable solvent, such as ether, benzene or toluene. The extract is washed with water until the washings are neutral, dried over magnesium sulfate, and filtered. The solvent is removed by distillation under reduced pressure and the residue of optically active steroid may be purified by chromatography on silica or neutral alumina and by crystallization from a suitable solvent, such as methanol.

In the resolution of Compound II or IV by forming an ester with a dibasic organic acid, such as succinic acid or phthalic acid, followed by formation of a diastereoisomeric salt with an optically active alkaloid base, such as brucine, strychnine, quinine, or cinchonine, the steroid is reacted with the anhydride of the dibasic acid to form the ester of the steroid. This is conveniently accomplished by heating a solution of equi-molar amounts of the steroid and the anhydride in pyridine to a temperature of from about 60° to 90° C. After esterification is complete, the mixture is cooled, poured into a dilute solution containing an excess of sodium carbonate and stirred until the solid is completely in solution. The solution may be extracted with ether or benzene to remove any unreacted steroid. A slight excess of dilute aqueous hydrochloric acid is then added to the solution and the precipitated steroid hydrogen phthalate is removed by filtration. The precipitate may be recrystallized from a suitable solvent, such as ether, petroleum ether, or a mixture of ether and petroleum ether. The alkaloid salt of the steroid hydrogen phthalate may be prepared by adding an equi-molar amount of the optically active alkaloid in powdered form to a solution of the steroid hydrogen phthalate in a suitable solvent, such as acetone or aqueous methanol, and warming the solution until all solids are in solution. The d- and l-diastereoisomers of the alkaloid salt of the steroid hydrogen phthalate may be separated by fractional crystallization from a suitable solvent, such as acetone or methanol. The separated optically active diastereoisomeric salts may be decomposed by treating a solution of the salts in a suitable organic solvent, such as acetone or methanol, with dilute aqueous hydrochloric acid. The hydrochloride of the optically active alkaloid remains in solution and the optically active steroid hydrogen phthalate precipitates as the salt is decomposed. The precipitate of the optically active steroid hydrogen phthalate may be purified by crystallization from a suitable solvent, such as acetic acid. The optically active steroids may be obtained by hdrolyzing the optically active steroid hydrogen phthalates. Hydrolysis may be accomplished by dissolving the optically active steroid hydrogen phthalates in an aqueous solution of a base, such as sodium hydroxide or potassium hydroxide, and extracting the mixture with a suitable solvent, such as ether, benzene or toluene, drying the extract over magnesium sulfate, filtering and removing the solvent by distillation under reduced pressure. The residue of optically active steroid may be purified by chromatography on silica or neutral alumina and by crystallization from a suitable solvent, such as methanol.

In the resolution of either of Compound II or IV by forming a d- or l-menthydrazone, equi-molar amounts of the steroid and d- or l-menthydrazide are dissolved in the smallest possible amount of a solution prepared by dissolving 2 g. of sodium acetate and 1 ml. of acetic acid in 100 ml. of ethyl alcohol. The resulting reaction mixture is boiled under reflux for one or two hours and then cooled. The cooled reaction mixture is concentrated almost to dryness, water is added, and the aqueous mixture is extracted with a suitable solvent, such as ether or benzene. The extract is dried over magnesium sulfate, filtered, and the solvent is removed by distillation under reduced pressure. The residue is a mixture of the d- and l-forms of the diastereoisomeric hydrazones and the optically active forms may be separated by fractional crystallization from a suitable solvent, such as methanol. The separated d- and l-diastereoisomeric hydrazones may be hydrolyzed to provide the d- and l-isomers of the steroid by dissolving the optically active hydrazones in a solution composed of acetic acid, pyruvic acid, and water, and allowing this solution to stand for about 16 hours at about 25° C. Sufficient water is then added to the reaction mixture to precipitate the optically active steroid and the mixture is extracted repeatedly with a suitable solvent, preferably chloroform. The extract is washed with water, washed with aqueous potassium bicarbonate solution, and washed with saturated aqueous sodium chloride solution. The extract is then dried over magnesium sulfate, filtered, and concentrated to dryness under reduced pressure. The residue of optically active steroid is purified by crystallization from a suitable solvent, such as methanol.

In the resolution of Compounds II or IV by the formation of a 4-(4-carboxyphenyl)-semicarbazone and forming a salt of the semicarbazone with an optically active alkaloid base, a mixture of 4-(4-carboxyphenyl)-semicarbazide and ethyl alcohol, to which 0.5 N sodium hydroxide solution has been added and which has been adjusted to a pH of 7 by the addition of glacial acetic acid, is prepared. An equi-molar amount, based on the semicarbazide, of the steroid to be resolved is then added and the mixture is refluxed for about 30 minutes and then cooled. Water and saturated aqueous sodium chloride solution are added to the cooled reaction mixture, the diluted reaction mixture is extracted with ether, the ether extract is removed, and the aqueous layer is acidified with glacial acetic acid. The precipitate of the 4-(4-carboxyphenyl)-semicarbazone of the steroid which forms is collected and dried and may be recrystallized from a suitable solvent, such as ethanol. A mixture of the semi-carbazone and methanol is brought to a boil and a methanol solution containing an equi-molar amount of an optically active alkaloid base, such as brucine, strychnine, quinine, or cinchonine, is added. After the semicarbazone and the optically active base are in solution, the volume of solvent is reduced by distillation under reduced pressure to saturation and the solution is then cooled slowly to room temperature. The precipitate of substantially pure optically active disastereoisomer is removed by filtration. The other optically active disastereoisomer is obtained by fractional crystallization of the residue provided by removal of the solvent from the filtrate. Methanol is a suitable solvent for the fractional crystallization. The optically active steroid may be regenerated by allowing a solution of the optically active diastereoisomeric alkaloid salt of the 4-(4-carboxyphenyl)-semicarbazone of the steroid in a solvent composed of acetic acid, pyruvic acid and water to stand for about 16 hours at 25° C., adding a sufficient amount of water to precipitate the regenerated steroid, extracting the solution repeatedly with chloroform, washing the combined chloroform extracts with water, aqueous potassium bicarbonate solution, and with saturated aqueous sodium chloride solution, drying the chloroform extract over magnesium sulfate, filtering, and concentrating to dryness by distillation under reduced pressure. The residue of optically active steroid is purified by crystallization from a suitable solvent, such as methanol.

The racemic form or the optically active d- and l-isomers of a 3-hydroxy or substituted oxy-13-lower alkyl-8(14)-secogona-1,3,5(10),9(11),15 - pentaen-14-one-17α-ol or a 3-substituted oxy-13-lower alkyl-17α-acyloxygona-1,3,5(10),9(11),15-pentaen - 14 - one may be catalytically hydrogenated by the use of a palladium catalyst to provide the racemic form or the optically active d- and l-isomers of a 3-hydroxy or substituted oxy-13-lower alkyl-8(14)-secogona-1,3,5(10),9(11)-tetraen-14-one-17α-ol or a 3-substituted oxy-13-lower alkyl-17α-acyloxygona-1,3,5(10),9(11),15-pentaen-14-one (Compound IV). Hydrogenation of a solution of the pentaene in an organic solvent containing the catalyst in suspension is continued until one molecular equivalent is absorbed. The catalyst is removed by filtration and the solvent is removed by distillation under reduced pressure. The residue is the racemic form or the d- or l-isomer of Compound IV corresponding to the form of Compound II used in the hydrogenation procedure.

The 17α-hydroxy group of Compounds II and IV may be oxidized to a keto group to provide Compounds I and III by use of aluminum isopropoxide and cyclohexanone in an inert solvent, such as dry benzene or toluene. A solution of the compound to be oxidized in the solvent which contains the aluminum isopropoxide is heated for a few minutes under nitrogen and the cyclohexanone is then added and the reaction mixture is heated on a steam bath. Compounds I and III may be isolated by adding a saturated aqueous solution of Rochelle salts with vigorous shaking to the reaction mixture, extracting with a suitable solvent, such as ether, removing the solvent by distillation under reduced pressure and steam distilling the residual solution. The residue after steam distillation is extracted with a suitable solvent, such as ether, the extract is dried over magnesium sulfate, filtered, and concentrated to dryness under reduced pressure. The residues are Compounds I and III and may be purified by crystallization from a suitable solvent, such as methanol. By oxidizing the 17α-hydroxy group of the undesired optically active isomer of Compounds II and IV to a 17-keto group, these isomers are converted to Compounds I and III. This step has the advantage that the undesired optically active isomer of Compounds II and IV may be reused as starting materials. The desired optically active isomer is used in the subsequent reaction steps.

The closure of the C-ring of Compound IV to provide a 3-hydroxy or substituted oxy-13-lower alkylgona-1,3,5(10),8,14-pentaen-17α-ol or a 3-substituted oxy-13-lower alkyl-17α - acyloxygona - 1,3,5(10),8,14 - pentaene (Compound V) may be conveniently accomplished in an organic solvent by treating Compound IV with an acid, preferably by maintaining a solution of Compound IV in an organic solvent, such as benzene or toluene, containing anhydrous para-toluenesulfonic acid at an elevated temperature, preferably about 60° C., for fifteen to thirty minutes. Compound V may be isolated by cooling the reaction mixture, adding ether, washing with dilute aqueous potassium bicarbonate solution and then with saturated aqueous sodium chloride solution, drying over magnesium sulfate, and concentrating to dryness by distillation under reduced pressure. The residue is Compound V and may be purified by recrystallization from a suitable agent, such as methanol.

Reduction of the $\Delta^{14}$-bond of Compound V to provide a 3-hydroxy or substituted oxy-13-lower alkylgona-1,3,5-(10),8 - tetraen - 17α - ol or a 3-substituted oxy-13-lower alkyl-17α-acyloxygona-1,3,5(10),8-tetraene steroid having a hydrogen atom on the C–14 carbon atom in the alpha position (Compound VI) may be accomplished by chemical means or by catalytic hydrogenation. Catalytic hydrogenation may be conveniently accomplished by shaking a solution of Compound V in a hydrocarbon solvent, such as benzene, toluene or xylene, containing a catalyst, such as 2% palladised calcium carbonate with hydrogen. Compound VI may be isolated by filtration, removal of the solvent and recrystallization of the residue from a suitable solvent, such as methanol. Chemical reduction may be accomplished by the use of a reducing agent, such as diimide or an alkyl borane, such as 2,3-dimethyl-2-butylborane. Reduction of the $\Delta^{14}$-bond of Compound V with diimide is accomplished by adding anhydrous hydrazine and methanol containing cupric acetate to a solution of Compound V in a suitable solvent, such as ethyl acetate. The mixture is stirred vigorously and allowed to stand overnight at a temperature within the range of from about 20° to 25° C. The reduction product is isolated by washing the reaction mixture with dilute aqueous hydrochloric acid solution, washing with dilute aqueous potassium bicarbonate solution, drying over magnesum sulfate, filtering, and concentrating to dryness under reduced pressure. The residue is Compound VI and may be purified by chromatography on silica, using a chloroform-methanol solution as a developing solvent and eluting the purified product from the chromatogram with an acetone-methanol solvent. Reduction of the $\Delta^{14}$-bond of Compound V with an alkyborane is accomplished by adding a solution of the alkylborane in an organic solvent, preferably bis-2-methoxyethyl ether to a solution of Compound V in an organic solvent, preferably the same solvent, and allowing the reaction mixture to stand for about two hours at room temperature. A small amount of a lower aliphatic acid, such as propionic acid, is added and the mixture is refluxed for from about two to four hours. The reaction product, Compound VI, may be recovered by cooling the reaction mixture, washing with dilute aqueous potassium bicarbonate solution, washing with saturated aqueous sodium chloride solution, drying over magnesium sulfate, filtering, and removing the solvent by distillation under reduced pressure. The residue of Compound VI is purified in the same manner as described above in connection with the reduction of Compound V with diimide.

Selective reduction of the $\Delta^8$-bond of Compound VI to provide a 3-hydroxy or substituted oxy-13-lower alkylgona 1,3,5(10) - trien - 17α-ol steroid having a hydrogen atom on the C–8 carbon atom in the beta position and hydrogen atoms on the C–9 and C–14 carbon atoms in the alpha position (Compound VII) is conveniently accomplished by adding a solution of Compound VI in a suitable solvent, such as dioxane or tetrahydrofuran, to a solution of potassium or sodium in liquid ammonia. Compound VII may be isolated from the reaction mixture by adding ammonium acetate and water and extraction with an organic solvent, preferably ether. The extract is dried over magnesium sulfate, filtered, and the solvent is removed by distillation under reduced pressure. The residue is Compound VII and may be purified by crystallization from a suitable solvent, such as a benzene-hexane mixture.

Oxidation of the 17α-hydroxy group of Compound VII to provide a 3-substituted oxy-13-lower alkylgona-1,3,5-(10)-trien-17-one compound (Compound VIII) is accomplished by allowing a solution of Compound VII in glacial acetic acid containing sodium dichromate to stand at a temperature of about 25° C. for about six hours and then adding water and extracting with a suitable organic solvent, preferably chloroform. The extract is washed with 5% aqueous potassium bicarbonate solution, washed with saturated aqueous sodium chloride solution, dried over magnesium sulfate, filtered, and concentrated to dryness under reduced pressure. The residue of Compound VIII may be purified by passing an ether solution through a column of neutral alumina and removing the purified product from the alumina by extraction with hot methanol. Compound VIII crystallizes from the cooled methanol solution.

Compound VII may also be oxidised to provide Compound VIII by the use of aluminum isopropoxide and cyclo-hexanone in an inert organic solvent, such as dry benzene or toluene in the same manner as described above in connection with the oxidation of Compounds II and IV to provide Compounds I and III.

If Compound VII has a 3-hydoxy group, this group is protected before oxidation by formation of a 3-substituted oxy group, such as a 3-alkoxy, preferably a 3-methoxy group. The formation of a 3-methoxy group may be accomplished by any conventional method, such as by adding dimethyl sulfate and aqueous sodium hydroxide solution separately to an aqueous methanol solution of Compound VII.

A 17α-hydroxy group of each of Compounds V, VI and VII which has a substituted oxy group on the 3-carbon atom may be acylated to provide the corresponding 17α-acyloxy compound. Acylation is accomplished in the same manner as described above in connection with acylation of the 17α-hydroxy group of Compounds II and IV. The $\Delta^{15}$-bond of the 17α-acetoxy derivative of Compound II may be catalytically hydrogenated to provide the 17α-acetoxy derivative of Compound IV; the C-ring of the latter derivative may be closed to provide the 17α-acetoxy derivative of Compound V; and the $\Delta^{14}$-bond of the latter derivative may be catalytically hydrogenated to provide the 17α-acetoxy derivative of Compound VI. However, reduction of the $\Delta^8$-bond of the 17α-acetoxy derivative of Compound VI with sodium or potassium in liquid ammonia removes the 17α-acetoxy group so that Compound VII provided by this reduction has a 17α-hydroxy group.

The 17α-acyloxy derivatives of Compounds II, IV, V, VI, and VII may be converted to the corresponding 17α-hydroxy compounds by cold hydrolysis with dilute aqueous alcoholic sodium hydroxide. The 17α-acyloxy derivatives of Compounds V, VI, and VII may also be converted to the corresponding 17α-hydroxy compounds by hydrolysis with a mineral acid, such as hydrochloric or sulfuric acid. Hydrolysis is conveniently accomplished by adding the mineral acid to a solution of the 17α-acyloxy derivative in methanol and allowing the solution to stand at room temperature for a period of time of from about 12 to 24 hours. The 17α-hydroxy compound may be isolated by concentrating the reaction mixture to dryness under reduced pressure, partitioning the residue between chloroform and water, separating the organic layer and washing with dilute aqueous potassium bicarbonate solution and then with saturated aqueous sodium chloride solution. The organic layer is dried over magnesium sulfate and concentrated to dryness under reduced pressure. The residue is the 17α-hydroxy compound and may be purified by crystallization from a suitable solvent, such as methanol.

The racemic form of Compounds V, VI and VII may be resolved by forming a diastereoisomeric ester thereof by any of the methods described above in connection with the resolution of Compounds II and IV.

PREPARATION 1

3-methoxy-13-methyl-8(14)-secogona-1,3,5(10), 9(11),15-pentaene-14,17-dione

A solution of 6.21 g. of 2 - methyl-4-hydroxy-cyclopentane-1,3-dione in 12 ml. of acetic anhydride and 60 ml. of pyridine is kept at room temperature for 18 hours. The solvent is removed by distillation under reduced pressure, and the residue is dissolved in 60 ml. of acetic acid and 60 ml. of water. The solution is heated on a steam bath for 90 minutes and the solvents are then removed by distillation under reduced pressure. The residue is triturated with 60 ml. of benzene and 40 ml. of chloroform. The solution is filtered and the filtrate is concentrated to dryness of distillation under reduced pressure. The residue is triturated with ether and filtered. 4.43 grams of ether insoluble 2-methyl-4-acetoxycyclopentane-1,3-dione having a melting point of 105–109° C. are obtained.

A mixture of 500 mg. of 1-vinyl-1-hydroxy-6-methoxy-1,2,3,4-tetrahydronaphthalene and 415 mg. of 2-methyl-4-acetoxycyclopentane - 1,3 - dione in 5 ml. of tertiary-butanol is stirred at room temperature for 42 hours. The solution is complete within the first 20 minutes of stirring. The solvents are removed by distillation under reduced pressure and the residue is taken up in ether. The ether solution is washed with 5% aqueous potassium bicarbonate solution, washed with saturated aqueous sodium chloride solution, dried over magnesium sulfate, and filtered. The solvent is removed from the filtrate by distillation under reduced pressure. The residue is 3-methoxy-13-methyl-8(14)-secogona-1,3,5(10),9(11),15-pentaene - 14, 17-dione and is dissolved in benzene - petroleum ether solvent. This solution is chromatographed on magnesium silicate (Florisil). The column is eluted with benzene, the benzene is removed from the benzene eluate by distillation under reduced pressure and the residue is crystallized from an ether-hexane solvent mixture. The crystallized material has a melting point of 83–85° C.

Analysis.—Calculated for $C_{19}H_{20}O_3$ (percent): C, 77.00; H, 6.80. Found (percent): C, 77.08; H, 6.68.

U.V. spectrum (methanol): $\lambda_{max}$. 295 m$\mu$ ($\epsilon$4,830), 264 m$\mu$ ($\epsilon$24,200), 213 m$\mu$ ($\epsilon$37,200).

In the same manner, 3-phenoxy-13-methyl-8(14)-secogona-1,3,5(10),9(11),15-pentaene - 14,17 - dione and 3-tetrahydropyranyloxy-13-methyl-8(14) - secogona - 1,3,5 (10),9(11),15-pentaene-14,17-dione are prepared by reacting 1 - vinyl-1-hydroxy-6-phenoxy-1,2,3,4-tetrahydronaphthalane and 1 - vinyl-1-hydroxy-6-tetrahydropyranyloxy - 1,2,3,4 - tetrahydronaphthalane with 2 - methyl - 4-acetoxycyclopentane-1,3-dione.

PREPARATION 2

3-methoxy-13-ethyl-8(14)-secogona-1,3,5(10), 9(11),15-pentaene-14,17-dione

A solution of 6.21 g. of 2 - ethyl - 4 - hydroxy-cyclopentane-1,3-dione in 12 ml. of acetic anhydride and 60 ml. of pyridine is kept at room temperature for 18 hours. The solvent is removed by distillation under reduced pressure, and the residue is dissolved in 60 ml. of acetic acid and 60 ml. of water. The solution is heated on a steam bath for 90 minutes and the solvents are then removed by distillation under reduced pressure. The residue is triturated with 60 ml. of benzene and 40 ml. of chloroform. The solution is filtered and the filtrate is concentrated to dryness by distillation under reduced pressure. The residue is triturated with ether and filtered. The product is 2-ethyl-4-acetoxycyclopentane-1,3-dione.

A mixture of 500 mg. of 1-vinyl-1-hydroxy-6-methoxy-1,2,3,4 - tetrahydronaphthalene, 400 mg. of 2 - ethyl-4-acetoxycyclopentane-1,3 - dione and 200 mg. of sodium acetate in 10 ml. of tertiary-butanol is refluxed under nitrogen for six hours. The mixture is cooled and the solvent is removed by distillation under reduced pressure. The residue is triturated with ether and filtered. The ether filtrate is washed with 5% aqueous potassium bicarbonate solution and then with saturated aqueous sodium chloride solution, dried over magnesium sulfate, and filtered. The solvent is removed from the filtrate by distillation under reduced pressure. The residue is 3-methoxy-13-ethyl-8(14)-secogona - 1,3,5(10),9(11),15 - pentaene-14,17-dione and is dissolved in benzene-petroleum ether solvent. This solution is chromatographed on magnesium silicate (Florisil). Elution with benzene gives a purified product.

In the same manner, 3 - phenoxy - 13 - ethyl-8(14)-secogona-1,3,5(10),9(11),15-pentaene-14,17-dione is prepared by a reaction between 1-vinyl-1-hydroxy-6-phenoxy-1,2,3,4-tetrahydronaphthalene and 2-ethyl-4-acetoxycyclopentane-1,3-dione.

PREPARATION 3

3-tetrahydropyranyloxy-13-ethyl-8(14)-secogona-1,3,5 (10),9(11),-15-pentaene-14,17-dione A solution of 3.06 g. of 1-vinyl-1-hydroxy-6-tetrahydropyranyloxy-1,2,3,4-tetrahydronaphthalene and 0.76 g. of thiourea in 12 ml. of acetic acid is stirred at 25° C. for four hours. The mixture is diluted with 60 ml. of ether and the precipitate of 6-tetrahydropyranyloxy-1,2,3,4-tetrahydronaphthylidene ethyl isothiouronium acetate is collected by filtration.

A mixture of 1.00 g. of 6-tetrahydropyranyloxy-1,2,3,4-tetrahydronaphythylidene ethyl isothiouronium acetate and 0.53 g. of 2-ethyl-4-acetoxycyclopentane-1,3-dione, 20 ml. of ether and 20 ml. of water is stirred at 25° C. for four hours. The ether and water are separated and the aqueous layer is extracted with ether. The ether and the ether layer are combined and washed with 5% aqueous potassium chloride solution. The ether solution is dried over magnesium sulfate, filtered, and the ether is removed by distillation under reduced pressure. The residue is triturated with hexane and filtered. The insoluble 3-tetrahydropyranyloxy - 8(14) - seco - 13 - ethylgona-1,3,5(10),9 (11),15-pentaene-14,17-dione is obtained on filtration.

The following examples illustrate methods of carrying out the present invention, but it is to be understood that these examples are given for purposes of illustration and not of limitation.

EXAMPLE 1

3-methoxy-17α-hydroxy-8(14)-secoestra-1,3,5(10),9 (11)-tetraen-14-one

A solution of 1.4 g. of lithium tri-tertiary-butoxyaluminum hydride in 50 ml. of tetrahydrofuran is added over a period of 5 minutes to a stirred solution of 1.5 g. of 3-methoxy-8(14)-secoestra - 1,3,5(10),9(11) - tetraene-14, 17-dione in 50 ml. of tetrahydrofuran. The reaction mixture is allowed to stand for two hours at 25° C. and then 50 ml. of saturated aqueous sodium sulfate solution are added. The inorganic precipitate is removed by filtration, and filtrate is extracted three times with ether and the solution is washed with saturated aqueous sodium chloride solution, dried over sodium sulfate and concentrated to dryness under reduced pressure. The residue is 3-methoxy-17α-hydroxy - 8(14)-secoestra - 1,3,5(10),9(11)-tetraen-14-one and is purified by chromatography on silica using a 40-1 chloroform-methanol solution as the developing solvent. The product is recovered by elution with a 1–1 acetone-methanol solvent.

In the same manner 3-hydroxy-17α-hydroxy-8(14)-secoestra-1,3,5(10),9(11)-tetraen-14-one is prepared by the reduction of 3-hydroxy-8(14)-secoestra-1,3,5(10),9 (11)-tetraene-14,17-dione, 3-phenoxy-17α-hydroxy-8(14)-secoestra-1,3,5(10),9(11)-tetraen-14-one is prepared by the reduction of 3-phenoxy-8(14)-secoestra-1,3, 5(10),9(11)-tetraene-14,17-dione, 3 - tetrahydropyranyloxy-17α-hydroxy-8(14)-secoestra - 1,3,5(10),9(11)-tetraen-14-one is prepared by the reduction of 3-tetrahydropyranyloxy-8-(14)-secoestra-1,3,5(10),9(11)-tetraene-14,17-dione, 3-hydroxy-13-ethyl-17α - hydroxy-8(14) - secogona-1,3,5-(10),9(11)-tetraen-14-one is prepared by the reduction of 3 - hydroxy - 13 - ethyl-8(14)-secogona-1,3,5(10),9(11)-tetraene-14,17-dione, 3-methoxy - 3 - ethyl-17α-hydroxy-8 (14)-secogona-1,3,5(10),9(11)-tetraen-14-one is prepared by the reduction of 3-methoxy-13-ethyl-8(14)-secogona-1,3,5(10),9(11) - tetraene - 14,17 - dione, 3 - phenoxy-13-ehtyl-17α-hydroxy-8(14) - secogona - 1,3,5(10),9(11)-tetraen-14-one is prepared by the reduction of 3-phenoxy-13-ethyl-8(14)-secogona - 1,3,5(10),9(11) - tetraene-14,17-dione, and 3-tetrahydropyranyloxy-13-ethyl-17α-hydroxy-8(14)-secogona-1,3,5(10),9(11)-tetraen-14-one is prepared by the reduction of 3-tetrahydropyranyloxy-13-ethyl-8(14)-secogona-1,3,5(10),9(11)-tetraene-14,17-dione.

EXAMPLE 2

3-methoxy-17α-hydroxy-8(14)-secoestra-1,3,5(10),9-(11),15-pentaen-14-one

A solution of 1.4 g. of lithium tri-tertiarybutoxyaluminum hydride in 50 ml. of tetrahydrofuran is added over a period of 5 minutes to a stirred solution of 1.5 g. of 3-methoxy-8(14) - secoestra - 1,3,5(10),9(11),15-pentaene-14,17-dione in 50 ml. of tetrahydrofuran. The reaction mixture is allowed to stand for two hours at 25° C. and then 50 ml. of saturated aqueous sodium sulfate solution are added. The inorganic precipitate is removed by filtration, the filtrate is extracted three times with ether and the solution is washed with saturated aqueous sodium chloride solution, dried over sodium sulfate and concentrated to dryness under reduced pressure. The residue is 3-methoxy-17α - hydroxy - 8(14)-secoestra-1,3,5(10),9-(11),15-pentaen-14-one and is purified by chromatography on silica using a 40–1 chloroform-methanol solution as the developing solvent. The product is recovered by elution with a 1–1 acetone-methanol solvent.

In the same manner 3-hydroxy-17α-hydroxy-8(14)-secoestra-1,3,5(10),9(11),15-pentaen-14-one is prepared by the reduction of 3 - hydroxy-8(14)-secoestra-1,3,5(10),9 (11),15-pentaene-14,17-dione, 3-phenoxy-17α-hydroxy-8-(14)-secoestra-1,3,5(10),9(11),15-pentaen-14-one is prepared by the reduction of 3-phenoxy-8(14)-secoestra-1,3, 5(10),9(11),15 - pentaene - 14,17-dione, 3-tetrahydropyranyloxy-17α-hydroxy-8(14) - secoestra-1,3,5(10),9(11),-15-pentaen-14-one is prepared by the reduction of 3-tetrahydropyranyloxy-8(14) - secoestra - 1,3,5(10),9(11),15-pentaene-14,17-dione, 3-hydroxy-13-ethyl - 17α-hydroxy-8-(14)-secoestra-1,3,5(10),9(11),15-pentaen-14-one is prepared by the reduction of 3-hydroxy-13-ethyl-8(14)-secoestra-1,3,5(10),9(11),15 - pentaene - 14,17 - dione, 3-phenoxy - 13 - ethyl-17α-hydroxy-8(14)-secoestra - 1,3,5(10),9 (11),15-pentaen-14-one is prepared by the reduction of 3-phenoxy-13-ethyl-8(14) - secoestra - 1,3,5(10),9(11),15-pentaene-14,17-dione, and 3-tetrahydropyranyloxy-13-ethyl-17α-hydroxy-8(14) - secoestra-1,3,5(10),9(11),15-pentaen-14-one is prepared by the reduction of 3-tetrahydropyranyloxy-13-ethyl - 8(14) - secoestra-1,3,5(10),9-(11),15-pentaene-14,17-dione.

EXAMPLE 3

3-methoxy-17α-hydroxy-8(14)-secoestra-1,3,5(10),9 (11)-tetraen-14-one 0.67 grams of 3-methoxy-17α-hydroxy-8(14)-secoestra-1,3,5(10),9(11),15-pentaen-14-one in 2.15 ml. of benzene containing 0.23 g. of 2% palladised calcium carbonate is shaken with hydrogen until an equi-molar amount of hydrogen is absorbed. The reaction mixture is filtered and the solvent is removed from the filtrate by distillation under reduced pressure. The residue of 3-methoxy-17α - hydroxy - 8(14) - secoestra - 1,3,5(10),9(11)-tetraen-14-one is purified by chromatography on silica using a 40–1 chloroform-methanol solution as the developing solvent. The product is recovered by elution with a 1–1 acetone-methanol solvent.

In the same manner 3-hydroxy-17α-hydroxy-8(14)-secoestra-1,3,5(10),9(11)-tetraen - 14 - one is prepared by the reduction of 3-hydroxy-17α-hydroxy-8(14)-secoestra - 1,3,5(10),9(11),15 - pentaen - 14 - one, 3 - phenoxy - 17α - hydroxy - 8(14) - secoestra - 1,3,5(10),9(11)-tetraen-14-one is prepared by the reduction of 3-phenoxy-17α - hydroxy - 8(14) - secoestra - 1,3,5(10),9(11),15-pentaen - 14 - one, 3 - tetrahydropyranyloxy - 17α - hydroxy - 8(14) - secoestra - 1,3,5(10),9(11) - tetraen - 14-one is prepared by the reduction of 3-tetrahydropyranyloxy - 17α - hydroxy - 8(14) - secoestro - 1,3,5(10),9(11), 15-pentaen - 14 - one, 3 - methoxy - 13 - ethyl - 17α-hydroxy - 8(14) - secogona - 1,3,5(10),9(11) - tetraen-14-one is prepared by the reduction of 3-methoxy-13-ethyl-17α - hydroxy - 8(14) - secogona - 1,3,5(10),9(11)-15 - pentaen - 14 - one, 3 - phenoxy - 13 - ethyl - 17α-hydroxy - 8(14) - secogona - 1,3,5(10),9(11) - tetraen-14 - one is prepared by the reduction of 3 - phenoxy-13 - ethyl - 17α - hydroxy - 8(14) - secogona - 1,3,5(10), 9(11),15 - pentaen - 14 - one, and 3 - tetrahydropyranyloxy-13-ethyl-17α-hydroxy - 8(14) - secogona - 1,3,5(10), 9(11)-tetraen - 14 - one is prepared by the reduction of 3 - tetrahydropyranyloxy - 13 - ethyl - 17α - hydroxy - 8(14) - secogona - 1,3,5(10),9(11),15 - pentaen - 14-one.

EXAMPLE 4

3-methoxy-17α-acetoxy-8(14)-secoestra-1,3,5(10),9(11)-tetraen-14-one

A solution of 0.5 g. of 3-methoxy-17α-hydroxy-8(14)-secoestra-1,3,5(10),9(11)-tetraen-14-one in 6 ml. of pyridine and 3 ml. acetic anhydride is kept at room temperature for 18 hours. The reaction mixture is concentrated to dryness under reduced pressure and 10 ml. of ether are added to the residue. The ether solution is washed with dilute aqueous potassium bicarbonate solution and then with saturated aqueous sodium chloride solution. The ether solution is dried over magnesium sulfate, filtered, and concentrated to dryness. The residue is 3-methoxy - 17α - acetoxy - 8(14) - secoestra - 1,3,5(10),9-(11)-tetraen-14-one.

U.V. $\lambda_{max}^{Methanol}$ 266 m$\mu$ $E_{cm}^{1\%}$ 532

I.R. (chloroform) 5.78–5.80$\mu$ (broad) [C=O and acetate] 8.1$\mu$ acetate

In the same manner 3-phenoxy-17α-acetoxy-8(14)-secoestra - 1,3,5(10),9(11) - tetraen - 14 - one is prepared by the acetylation of 3-phenoxy-17α-hydroxy - 8(14)-secoestra - 1,3,5(10),9(11) - tetraen - 14 - one, 3 - tetrahydropyranyloxy - 17α - acetoxy - 8(14) - secoestra-1,3,5(10),9(11)-tetraen-14-one is prepared by the acetylation of 3 - tetrahydropyranyloxy - 17α - hydroxy - 8(14)-secoestra - 1,3,5(10),9(11) - tetraen - 14 - one, 3 - methoxy - 13 - ethyl - 17α - acetoxy - 8(14) - secogona - 1,3,5-(10),9(11)-tetraen-14-one is prepared by the acetylation of 3 - methoxy - 13 - ethyl - 17α - hydroxy - 8(14)-secogona - 1,3,5(10),9(11) - tetraen - 14 - one, 3 - phenoxy - 13 - ethyl - 17α - acetoxy - 8(14) - secogona-1,3,5(10),9(11) - tetraen - 14 - one is prepared by the acetylation of 3 - phenoxy - 13 - ethyl - 17α - hydroxy-8(14) - secogona - 1,3,5(10),9(11) - tetraen - 14 - one and 3 - tetrahydropyranyloxy - 13 - ethyl - 17α - acetoxy-8(14) - secogona - 1,3,5(10),9(11) - tetraen - 14-one is prepared by the acetylation of 3-tetrahydropyranyloxy-13 - ethyl - 17α - hydroxy - 8(14) - secogona - 1,3,5(10),9(11)-tetraen-14-one.

EXAMPLE 5 d- and l-3-methoxy-17α-hydroxy-8(14)-secoestra-1,3,5(10),9(11)-tetraen-14-one 233 milligrams of l-menthoxyacetyl chloride is added slowly to 296 mg. of 3-methoxy-17α-hydroxy-8(14)-secoestra-1,3,5(10),9(11)-tetraen-14-one dissolved in 3 cc. of anhydrous pyridine and the mixture is left overnight. The major part of the pyridine is removed by distillation and the residue is poured into 20 cc. water. The crystalline precipitate is removed by filtration and the filtrate is extracted with ether and then with benzene. The crystalline precipitate is dissolved in an ether-benzene mixture and the extract is added to the solution. The solution is washed with dilute aqueous hydrochloric acid and then with dilute aqueous sodium hydroxide and finally with water. The solvent is removed by distillation under reduced pressure, the residue is the diastereoisomeric mixture of d- and l-3-methoxy-17α-hydroxy-8(14)-secoestra-1,3,5-(10),9(11)-tetraen-14-one l-menthoxyacetates and is resolved by fractional crystallization from methanol.

The d- and l-3-methoxy-17α-hydroxy-8(14)-secoestra-1,3,5(10),9(11),-tetraen - 14 -one 1 - menthoxyacetates obtained by fractional recrystallization are separately hydrolyzed by reacting at 25° for one hour with 12 mole equivalents of 5% ethanolic potassium hydroxide. The solution is cooled and extracted with ether. The ether extract is dried over magnesium sulfate, filtered, and the ether is removed by distillation under reduced pressure. The residue is optically active 3 - methoxy - 17α-hydroxy-8(14)-secoestra-1,3,5(10),9(11)-tetraen-14-one and may be purified by crystallization from methanol.

In the same manner 3-phenoxy-17α-hydroxy - 8(14)-secoestra - 1,3,5(10),9(11) - tetraen - 14 - one is resolved to provide d- and l - 3 - phenoxy - 17α - hydroxy-8(14)-secoestra - 1,3,5 - (10),9(11) - tetraen - 14 - one, 3-methoxy - 13 - ethyl - 17α - hydroxy - 8(14) - secogona-1,3,5(10),9(11) - tetraen - 14 - one is resolved to provide d- and l - 3 - methoxy - 13 - ethyl - 17α - hydroxy - 8(14)-secogona -1,3,5(10),9(11) - tetraen - 14-one, 3-phenoxy- 13 - ethyl - 17α - hydroxy - 8(14) - secogona - 1,3,5(10), 9(11) - tetraen - 14 - one is resolved to provide d- and l - 3 - phenoxy - 13 - ethyl - 17α - hydroxy - 8(14)-secogona - 1,3,5(10),9(11) - tetraen - 14 - one, and 3-tetrahydropyranyloxy - 17α - hydroxy - 8(14) - secoestra-1,3,5(10),9(11) - tetraen - 14 - one is resolved to provide d- and l - 3 - tetrahydropyranyloxy - 17α - hydroxy-8(14) - secoestra - 1,3,5(10),9(11) - tetraen - 14 - one.

EXAMPLE 6 d- and l-3-methoxy-17α-hydroxy-8(14)-secoestra-1,3,5(10),9(11)-tetraen-14-one

A solution of 296 mg. of 3-methoxy-17α-hydroxy-8(14)-secoestra-1,3,5(10),9(11)-tetraen-14-one and 148 mg. of resublimed phthalic anhydride in 5 ml. of pyridine is heated for 12 hours in a flask at 90°–100° C. with occasional stirring. The mixture is cooled and poured into 20 ml. of water. This mixture is stirred until all solvents are in solution. A slight excess of dilute hydrochloric acid is added and the precipitate which forms is removed by filtration and dried. The precipitate is dl-3-methoxy-17α-hydroxy-8(14)-secoestra - 1,3,5(10),9(11) - tetraen-14-one hydrogen phthalate.

444 milligrams of dl-3-methoxy-17α-hydroxy - 8(14)-secoestra - 1,3,5(10),9(11) - tetraen - 14 - one hydrogen phthalate in solution in 6 ml. of acetone containing 394 mg. of powdered anhydrous brucine is warmed until clear. The solution is then cooled and the solvent is removed by distillation under reduced pressure. The residue is a diastereo-isomeric mixture of brucine salts of d- and l - 3 - methoxy - 17α - hydroxy - 8(14) - secoestra-1,3,5(10),9(11)-tetraen-14-one hydrogen phthalate. The d- and l-isomers of the brucine salt of 3-methoxy-17α-hydroxy-8(14)-secoestra - 1,3,5(10),9(11) - tetraen - 14-one hydrogen phthalate are separated by fractional crystallization from acetone.

The separated d- and l-isomers are separately dissolved in the minimum quantity of ethanol, a slight excess of 1 N hydrochloric acid is added and the mixture is stirred for one hour. The precipitates of resolved steroid hydrogen phthalates are filtered and washed with water. Each precipitate is added to 5% aqueous sodium hydroxide solution containing an excess of sodium hydroxide. The solution is kept at 25°–30° C. for 2 hours, cooled and extracted three times with 5 cc. portions of ether. The ether extracts are combined, washed with 5 cc. portions of water until neutral, dried over magnesium sulfate and filtered and the ether is removed by distillation under reduced pressure. The residue is optically active d- and l-3-methoxy-17α-hydroxy-8(14)-secoestra-1,3,5(10),9(11) - tetraen-14-one and is purified by recrystallization from methanol.

In the same manner 3 - phenoxy-17α-hydroxy-8(14)-secoestra - 1,3,5(10),9(11) - tetraen-14-one and 3-tetrahydropyranyloxy - 17α - hydroxy - 8(14) - secoestra-1,3,5(10),9(11)-tetraen-14-one are resolved to provide d- and l - 3 - phenoxy - 17α - hydroxy - 8(14) - secoestra - 1,3,5(10),9(11)-tetraen-14-one and d- and l-3 - tetrahydropyranyloxy-17α-hydroxy - 8(14) - secoestra - 1,3,5(10), 9(11)-tetraen-14-one.

In the same manner 3-phenoxy-17α-hydroxy-8(14)-secoestra-1,3,5(10),9(11)-tetraen-14-one is resolved to provide d- and l - 3 - phenoxy - 17α - hydroxy - 8(14)-secoestra - 1,3,5(10),9(11)-tetraen - 14 - one, 3-methoxy-13 - ethyl - 17α - hydroxy - 8(14) - secogona - 1,3,5(10), 9(11) - tetraen - 14 - one is resolved to provide d- and l - 3 - methoxy - 13 - ethyl - 17α - hydroxy - 8(14)-secogona-1,3,5(10),9(11) - tetraen - 14 - one, 3-phenoxy-13 - ethyl - 17α - hydroxy - 8(14) - secogona - 1,3,5(10), 9(11) - tetraen - 14 - one is resolved to provide d- and l - 3 - phenoxy - 13 - ethyl - 17α - hydroxy - 8(14)-secogona - 1,3,5(10),9(11) - tetraen - 14 - one, and 3-tetrahydropyranyloxy - 17α - hydroxy - 8(14) - secoestra-1,3,5(10),9(11) - tetraen - 14 - one is resolved to provide d- and l - 3 - tetrahydropyranyloxy - 17α - hydroxy-8(14)-secoestra - 1,3,5(10),9(11) - tetraen - 14 - one.

EXAMPLE 7 d- and l-3-methoxy-17α-hydroxy-8(14)-secoestra-1,3,5(10),9(11)-tetraen-14-one A solution of three grams of 3-methoxy-17α-hydroxy-8(14)-secoestra-1,3,5(10),9(11)-tetraen-14-one and 2.14 g. of l-menthydrazide in 25 ml. of 95% ethyl alcohol containing 500 mg. of sodium acetate and 0.25 ml. of acetic acid is refluxed for two hours and then cooled to room temperature. The solvent is removed by distillation under reduced pressure. The residue is a mixture of the diastereoisomers of the l-menthydrazone of 3-methoxy - 17α - hydroxy - 8(14) - secoestra-1,3,5(10),9(11)-tetraen-14-one. The optically active d- and l-diastereoisomeric isomers are separated by fractional recrystallization from methanol.

One gram of each of the optically active diastereoisomeric isomers of the l-menthydrazone of 3-methoxy-17α-hydroxy-8(14)-secoestra - 1,3,5(10),9(11) - tetraen-14-one is dissolved separately in a solution composed of 15 ml. of acetic acid, 1.5 ml. of pyruvic acid and 5 ml. of water and the solution is allowed to stand overnight at a temperature of 20–25° C. 100 milliliters of water is added to each mixture and the resulting solutions are each extracted four times with 25 ml. portions of chloroform. The combined extracts in each case are washed with 5% aqueous potassium bicarbonate solution, washed with saturated aqueous sodium chloride solution, dried over magnesium sulfate, filtered, and concentrated to dryness by distillation under reduced pressure. The residues are the d- and l-isomers of 3-methoxy-17α - hydroxy - 8(14) - secoestra - 1,3,5(10),9(11)-tetraen-14-one.

In the same manner 3 - methoxy-17α-acetoxy-8(14)-secoestra - 1,3,5(10),9(11)-tetraen-14-one is resolved to produce d- and l-3-methoxy-17α-acetoxy - 8(14)-secoestra-1,3,5(10),9(11)-tetraen-14 - one, 3 - phenoxy-17α-hydroxy - 8(14) - secoestra-1,3,5(10),9(11)-tetraen-14-one, 3 - tetrahydropyranyloxy - 17α-hydroxy-8(14)-secoestra - 1,3,5(10),9(11) - tetraen-14-one and the corresponding 17α-acetoxy steroids are resolved to provide d- and l-3-phenoxy - 17α - hydroxy - 8(14)-secoestra-1,3,5(10),9(11) tetraen-14-one, d- and l-3-tetetrahydropyranyloxy - 17α - hydroxy-8(14)-secoestra-1,3,5(10),9(11)-tetraen - 14 - one and the d- and l-isomers of the corresponding 17α - acetoxy compounds, 3-methoxy-13-ethyl-17α - hydroxy-8(14)-secogona - 1,3,5(10),9(11)-tetraen-14 one is resolved to provide d- and l-3-methoxy-13-ethyl-17α - 8(14)-secogona - 1,3,5(10),9(11)-tetraen-14-one, 3-phenoxy - 13 - ethyl-17α-hydroxy-8(14)-secogona-1,3,5(10),9(11)-tetraen-14-one is resolved to provide d- and l-3-phenoxy - 13-ethyl - 17α-hydroxy-8(14)-secogona-1,3,5(10),9(11)-tetraen-14-one, and 3-tetrahydropyranyloxy-13 - ethyl-17α-hydroxy-8(14)-secogona-1,3,5(10),9(11)-tetraen - 14-one is resolved to provide d- and l-3-tetrahydropyranyloxy-13-ethyl-17α-hydroxy-8(14)-secogona-1,3,5(10),9(11)-tetraen-14-one, 3 - methoxy-13-ethyl-17α - acetoxy - 8(14) - secogona - 1,3,5(10),9(11)-tetraen-14-one is resolved to provide d- and l-3-methoxy-13-ethyl - 17α - acetoxy-8(14)-secogona-1,3,5(10),9(11)-tetraen-14-one, 3 - phenoxy -13 - ethyl-17α - acetoxy-8(14)-secogona-1,3,5(10),9(11) - tetraen - 14 - one is resolved to provide d- and l-3-phenoxy - 13 - ethyl-17α-acetoxy - 8(14)-secogona - 1,3,5(10),9(11)-tetraen-14-one, and 3 - tetrahydropyranyloxy-13-ethyl-17α-acetoxy-8(14)-secogona-1,3,5(10),9(11) - tetraen - 14 - one is resolved to provide d- and l - 3 - tetrahydropyranyloxy-13-ethyl-17α-acetoxy - 8(14) - secogona - 1,3,5(10),9(11)-tetraen-14-one.

EXAMPLE 8 d- and l-3-methoxy-17α-hydroxy-8(14)-secoestra-1,3,5(10),9(11)-tetraen-14-one 7.8 grams of 3-methoxy-17α-hydroxy-8(14)-secoestra-1,3,5(10),9(11) - tetraen-14-one are added to a solution prepared by adding 55 ml. of 0.5 N sodium hydroxide solution to a mixture of 40 ml. of 95% ethyl alcohol and 5.0 g. of 4-(4-carboxyphenyl)-semicarbazide which had been adjusted to a pH of 7 by the addition of glacial acetic acid. The resulting mixture is refluxed for 30 minutes and then cooled to room temperature. 100 milliliters of water and 15 ml. of saturated aqueous sodium chloride solution are added. The resulting mixture is extracted with two 30 ml. portions of ether. The aqueous layer is separated and acidified with glacial acetic acid. The precipitate is removed by filtration, dried and recrystallized from ethanol. The recrystallized material is the 4-(4-carboxyphenyl)-semicarbazone of 3-methoxy-17α-hydroxy-8(14)-secoestra - 1,3,5(10),9(11) - tetraen-14-one.

A mixture of 140 ml. of methanol and 2.9 g. of the 4-(4-carboxyphenyl)semicarbazone of 3-methoxy-17α-hydroxy-8(14)-secoestra - 1,3,5(10),9(11) - tetraen-14-one are brought to a boil and 2.66 g. of l-brucine in solution in 20 ml. of methanol are added. After the solution is complete, the volume is reduced to 110 ml. The solution is then heated to boiling and filtered while hot. The filtered solution is reduced to a volume of 100 ml. and cooled slowly. The crystalline material which forms upon cooling is removed by filtration. This material is substantially pure l-brucine salt of optically active 4 - (4-carboxyphenyl)-semicarbazone of 3-methoxy-17α-hydroxy-8(14)-secoestra-1,3,5(10),9(11) - tetraen-14-one. The l-brucine salt of the other optically active disastereoisomer of 4-(4-carboxyphenyl)-semicarbazone is obtained by fractional crystallization from methanol of the residue obtained by removal of the solvent from the filtrate.

One gram of each of the l-brucine salts of optically active 4-(4-carboxyphenyl)-semicarbazone of 3-methoxy-17α-hydroxy - 8(14) - secoestra - 1,3,5(10),9(11)- tetraen-14-one is dissolved separately in a solution comprising 15 ml. of acetic acid, 1.5 ml. of pyruvic acid and 5 ml. of water. The resulting solutions are kept overnight at 20–25° C. 100 milliliters of water is added to each solution and each is extracted four times with 25 ml. portions of chloroform. The chloroform extracts of each solution are combined and the resulting combined extracts are each washed with 5% aqueous potassium bicarbonate solution, saturated aqueous sodium chloride solution, dried over magnesium sulfate, filtered and concentrated to dryness. The residues are the d- and l-isomers of 3 - methoxy - 17α - hydroxy-8(14)-secoestra-1,3,5(10),9(11)-tetraen-14-one.

In the same manner 3-methoxy-17α-acetoxy-8(14)-secoestra-1,3,5(10),9(11)-tetraen-14-one is resolved to produce d- and l-3-methoxy-17α-acetoxy-8(14)-secoestra-1,3,5(10),9(11) - tetraen - 14 - one, 3 - phenoxy - 17α-hydroxy - 8(14) - secoestra - 1,3,5(10),9(11) - tetraen-14 - one, 3 - tetrahydropyranyloxy - 17α - hydroxy - 8(14-secoestra-1,3,5(10),9(11)-tetraen-4-one and the corresponding 17α-acetoxy steroids are resolved to provide d- and l-3 - phenoxy - 17α - hydroxy - 8(14) - secoestra-1,3,5 (10),9(11)-tetraen-14-one, d- and l-3-tetrahydropyranyloxy - 17α - hydroxy - 8(14) - secoestra - 1,3,5(10),9(11)-tetraen-14-one and the d- and l-isomers of the corresponding 17α-acetoxy compounds, 3-methoxy-13-ethyl-17α-hydroxy - 8(14) - secogona - 1,3,5(10),9(11) - tetraen - 14-one is resolved to provide d- and l-3-methoxy-13-ethyl-17α - hydroxy - 8(14) - secogona - 1,3,5(10),9(11)-tetraen - 14 - one, 3 - phenoxy - 13 - ethyl - 17α - hydroxy-8(14) - secogona - 1,3,5(10),9(11) - tetraen - 14 - one is resolved to provide d- and l-3-phenoxy-13-ethyl-17α-hydroxy - 8(14) - secogona - 1,3,5(10),9(11) - tetraen - 14-one, and 3-tetrahydropyranyloxy-13-ethyl-17α-hydroxy-8 (14)-secogona-1,3,5(10),9(11)-tetraen-14-one is resolved to provide d- and l-3-tetrahydropyranyloxy-13-ethyl-17α-hydroxy - 8(14) - secogona - 1,3,5(10),9(11) - tetraen-14 - one, 3 - methoxy - 13 - ethyl - 17α - acetoxy - 8(14)-secogona-1,3,5(10),9(11)-tetraen-14-one is resolved to provide d- and l-3-methoxy-13-ethyl-17α-acetoxy-8(14)-secogona - 1,3,5(10),9(11) - tetraen - 14 - one, 3 - phenoxy - 13 - ethyl - 17α - acetoxy - 8(14) - secogona - 1,3,5 (10),9(11)-tetraen-14-one is resolved to provide d- and l - 3 - phenoxy - 13 - ethyl - 17α - acetoxy - 8(14)-secogona-1,3,5(10),9(11)-tetraen-14 one, and 3-tetrahydropyranyloxy - 13 - ethyl - 17α - acetoxy - 8(14) - secogona-1,3,5(10),9(11)-tetraen-14-one is resolved to provide d- and l-3-tetrahydropyranyloxy-13-ethyl-17α-acetoxy-8(14)-secogona-1,3,5(10),9(11)-tetraen-14-one.

EXAMPLE 9 d- and l-3-methoxy-17α-acetoxy-8(14)-secoestra-1,3,5 (10),9(11)-tetraen-14-one

A solution of 0.5 g. of each of d- and l-3-methoxy-17α-hydroxy - 8(14) - secoestra - 1,3,5(10),9(11) - tetraen-14-one in 6 ml. of pyridine and 3 ml. of acetic anhydride is kept at room temperature for 18 hours. The reaction mixtures are concentrated to dryness under reduced pressure and 10 ml. of ether are added to each of the residues. The ether solutions are washed with dilute aqueous potassium bicarbonate solution and then with saturated aqueous sodium chloride solution. The ether solutions are dried over magnesium sulfate, filtered, and concentrated to dryness. The residues are d- and l-3-methoxy-17α-acetoxy-8(14)-secoestra-1,3,5(10),9(11)-tetraen-14-one.

In the same manner, racemic 3-methoxy-17α-acetoxy-8(14)-secoestra-1,3,5(10),9(11)-tetraen - 14 - one is prepared by the acetylation of racemic 3-methoxy-17α-hydroxy - 8(14) - secoestra-1,3,5(10),9(11)-tetraen-14-one, racemic and d- and l-3-phenoxy-17α-acetoxy-8(14)-secoestra-1,3,5(10),9(11)-tetraen-14-one are prepared by the acetylation of racemic and d- and l-3-phenoxy-17α-hydroxy - 8(14) - secoestra-1,3,5(10),9(11)-tetraen-14-one, racemic and d- and l-3-tetrahydropyranyloxy-17α-acetoxy-8(14)-secoestra-1,3,5(10),9(11)-tetraen-14 - one are prepared by the acetylation of racemic and d- and l-3-tetrahydropyranyloxy - 17α - hydroxy - 8(14) - secoestra-1,3,5(10),9(11)-tetraen-14-one, racemic and d- and l-3-methoxy - 13 - ethyl-17α-acetoxy-8(14)-secogona-1,3,5 (10),9(11)-tetraen-14-one are prepared by the acetylation of racemic and d- and l-3-methoxy-13-ethyl-17α-hydroxy-8(14)-secogona-1,3,5(10),9(11)-tetraen-14 - one, racemic and d- and l-3-phenoxy-13-ethyl-17α-acetoxy-8(14)-secogona-1,3,5(10)9,(11)-tetraen-14-one are prepared by the acetylation of racemic and d- and l-3-phenoxy-l-3-ethyl-17α - hydroxy - 8(14)-secogona-1,3,5(10),9(11)-tetraen-14-one, and racemic and d- and l-3-tetrahydropyranyloxy-13 - ethyl - 17α-acetoxy-8(14)-secogona-1,3,5(10),9(11)-tetraen-14-one are prepared by the acetylation of racemic and d- and l-3 - tetrahydropyranyloxy - 13-ethyl-17α-hydroxy-8(14)-secogona-1,3,5(10),9(11)-tetraen-14-one.

EXAMPLE 10

3-methoxy-8(14)-secoestra-1,3,5(10),9(11)-tetraen-14,17-dione

A solution consisting of 255 mg. of optically active 3 - methoxy - 17α-hydroxy-8(14)-secoestra-1,3,5(10),9 (11)-tetraen-14-one, 306 mg. of freshly distilled aluminum isopropoxide and 13 ml. of dry toluene is heated for 15 minutes on a steam bath under an atmosphere of nitrogen. The solution is cooled to 25° C. and 2.6 ml. of distilled cyclohexanone are added. The solution is again heated on the steam bath under nitrogen for 40 minutes and then cooled in ice. A saturated aqueous solution of Rochelle salts is added with vigorous shaking and the product is extracted with ether. The ether is removed by evaporation and the remaining solution is steam distilled. The residue is extracted with ether and the ether solution is dried over magnesium sulfate, filtered and evaporated to dryness. The residue is 3-methoxy-8(14)-secoestra-1,3,5 (10),9(11)-tetraen-14,17-dione and may be purified by recrystallization from methanol.

In the same manner optically active 3-phenoxy-17α-hydroxy - 8(14) - secoestra-1,3,5(10),9(11)-tetraen-14-one is oxidized to provide 3-phenoxy-8(14)-secoestra-1,3, 5(10)9,(11)-tetraen-14,17-dione, optically active 3-tetrahydropyranyloxy - 17α - hydroxy-8(14)-secoestra-1,3,5 (10),9(11)-tetraen-14-one is oxidized to provide 3-tetrahydropyranyloxy - 8(14) - secoestra - 1,3,5(10),9(11)-tetraen-14,17-dione, optically active 3-methoxy-13-ethyl-17α - hydroxy - 8(14)-secogona-1,3,5(10),9(11)-tetraen-14-one is oxidized to provide 3-methoxy-13-ethyl-8(14)-secogona - 1,3,5(10),9(11)-tetraen-14,17-dione, optically active 3 - phenoxy-13-ethyl-17α-hydroxy-8(14)-secogona-1,3,5-(10),9(11)-tetraen-14-one is oxidized to provide 3-phenoxy - 13 - ethyl - 17α-hydroxy-8(14)-secogona-1,3,5 (10),9(11)-tetraen-14,17-dione, optically active 3-tetrahydropyranyloxy - 13 - ethyl - 17α-hydroxy-8(14)-secogona-1,3,5(10),9(11)-tetraen-14-one is oxidized to provide 3 - tetrahydropyranyloxy - 13 - ethyl-17α-hydroxy-8 (14)-secogona-1,3,5(10),9(11)-tetraen-14,17-dione.

Similarly, 3 - methoxy - 8(14) - secoestra - 1,3,5(10, 9(11)-15-pentaene-14,17-dione is obtained by oxidation of optically active 3-methoxy-17α-hydroxy-8(14)-secoestra-1,3,5(10),9(11),15-pentaen-17-one.

In the same manner optically active 3-phenoxy-17α-hydroxy - 8(14) - secoestra - 1,3,5(10),9(11),15 - pentaen - 14 - one is oxidized to provide 3 - phenoxy - 8(14) - secoestra - 1,3,5(10),9(11),15 - pentaen - 14,17 - dione, optically active 3 - tetrahydropyranycloxy - 17α - hydroxy - 8(14) - secoestra - 1,3,5(10),9(11),15 - pentaen - 14 - one is oxidized to provide 3 - tetrahydropyranyloxy - 8(14) - secoestra - 1,3,5(10),9(11),15 - pentaen - 14,17 - dione, optically active 3 - methoxy -13 - ethyl - 17α - hydroxy - 8(14) - secogona - 1,3,5(10,9(11),15 - pentaen - 14 - one is oxidized to provide 3 - methoxy - 13 - ethyl - 8(14) - secogona - 1,3,5(10),9(11),15 - pentaen - 14,17 - dione, optically active 3 - phenoxy - 13 - ethyl - 17α - hydroxy - 8(14) - secogona - 1,3,5(10),9(11),15 - pentaen - 14 - one is oxidized to provide 3 - phenoxy - 13 - ethyl - 17α - hydroxy - 8(14) - secogona - 1,3,5(10),9(11),15 - pentaen - 14,17 - dione, optically active 3 - tetrahydropyranyloxy - 13 - ethyl - 17α - hydroxy - 8(14) - secogona - 1,3,5(10),9(11),15 - pentaen - 14 - one is oxidized to provide 3 - tetrahydropyranyloxy - 13 - ethyl - 17α - hydroxy - 8(14) - secogona - 1,3,5(10),9(11),15 - pentaen - 14,17 - dione.

EXAMPLE 11

Racemic and d- and l-3-methoxyestra-1,3,5(10),8(14)-pentaen-17α-ol

Separate solutions of 580 mg. of d- and l-3-methoxy-17α - hydroxy - 8(14) - secoestra - 1,3,5(10),9(11)-tetraen - 14 - one in 25 ml. of anhydrous benzene are added to a separate stirred mixture of 60 mg. of anhydrous p-toluene sulfonic acid in 20 ml. of benzene. Each mixture is kept at 60° C. under nitrogen for 40 minutes, then cooled and each is added to a 5% aqueous potassium bicarbonate solution which contains an excess of potassium bicarbonate. The layers of each reaction mixture are separated and the organic layer of each is washed with saturated aqueous sodium chloride dried over magnesium sulfate and concentrated to dryness under reduced pressure. The residues are racemic and d- and l-3-methoxyestra - 1,3,5(10),8,14 - pentaen - 17α - ol and are purified by chromatography on silica using chloroform as a developing solvent. The products are recovered by elution with a 1–1 acetone-methanol solution.

In the same manner, racemic and d- and l–3,17α-dihydroxyestra -1,3,5(10,8,14 - pentaene are prepared from racemic and d- and 1 - 3,17α - dihydroxy - 8(14) - secoestra - 1,3,5(10),9(11) - tetraen - 14 - one, racemic and d- and 1 - 3 - phenoxyestra-1,3,5(10),8,14-pentaen-17α-ol are prepared from racemic and d- and l-3-phenoxy-17α- hydroxy - 8(14) - secoestra - 1,3,5(10),9(11) - tetraen - 14 - one, racemic d- and l-3-tetrahydropyranyloxyestra-1,3,5(10),8,14 - pentaen - 17α - ol are prepared from racemic and d- and l-3-tetrahydropyranyloxy-17α-hydroxy - 8(14) - secoestra - 1,3,5(10),9(11) - tetraen - 14 - one, racemic and d- and l-3-methoxy-17α-acetoxyestra-1,3,5(10),8,14 - pentaene are prepared from racemic and d- and 1 - 3 - methoxy - 17α - acetoxy-8(14)-secoestra-1,3,5(10),9(11) - tetraen - 14 - one, racemic and d- and 1 - 3 - phenoxy - 17α - acetoxyestra - 1,3,5(10),8,14 - pentaene are prepared from racemic and d- and l-3-phenoxy-17α - acetoxy - 8(14) - secoestra - 1,3,5(10),9(11) - tetraen - 14 - one, racemic and d- and l-3-tetrahydropyranyloxy - 17α - acetoxyestra - 1,3,5(10),8,14 - pentaene are prepared from racemic and d- and l-3-tetrahydropyranyloxy - 17α - acetoxy - 8(14) - secoestra - 1,3,5(10,9(11) - tetraen - 14 - one, racemic and d- and l-3,17α-dihydroxy-13 - ethylgona - 1,3,5(10),8,14 - pentaene are prepared from racemic and d- and 1-3,17α-dihydroxy-13-ethyl-8(14) - secogona - 1,3,5(10),9(11) - tetraen - 14 - one, racemic and d- and l-3-methoxy-13-ethyl-17α-hydroxygona-1,3,5(10),8,14-pentaene are prepared from racemic and d- and 1 - 3 - methoxy-13-ethyl-17α-hydroxy-8(14)-secogona - 1,3,5(10),9(11) - tetraen - 14 - one, racemic and d- and 1 - 3 - phenoxy-13-ethyl-17α-hydroxygona-1,3,5(10),8,14 - pentaene are prepared from racemic and d- and 1 - 3 - phenoxy - 13 - ethyl - 17α - hydroxy - 8(14)-secogona - 1,3,5(10),9(11) - tetraen - 14 - one, and racemic and d- and l-3-tetrahydropyranyloxy-13-ethyl-17α-hydroxygona - 1,3,5(10),8,14 - pentaene are prepared from racemic and d- and l-3-tetrahydropyranyloxy-13-ethyl-17α - hydroxy - 8(14) - secogona - 1,3,5(10),9(11) - tetraen - 14 - one.

EXAMPLE 12

Racemic and d- and l-3-methoxyestra-1,3,5(10),8-tetraen-17α-ol 330 milligrams of each of racemic and d- and l-3-methoxy - 17α - hydroxyestra - 1,3,5(10),8,14 - pentaene in 11 ml. of benzene containing 1.2 g. of 2% palladised calcium carbonate is shaken with hydrogen until an equimolar amount of hydrogen is absorbed. The reaction mixtures are filtered and the solvent is removed from the filtrates by distillation under reduced pressure. The residues are racemic and d- and l-3-methoxyestra-1,3,5(10),8-tetraten-17α-ol and are purified by chromatography on silica using a 40–1 chloroform-methanol solution as the developing solvent. The products are recovered by elution with a 1–1 acetone-methanol solvent.

In the same manner, racemic and d- and l-3,17α-dihydroxyestra-1,3,5(10, 8-tetraene are prepared by the hydrogenation of racemic and d- and l-3,17α-dihydroxyestra-1,3,5(10), 8,14-pentaene, racemic and d- and l-3-phenoxy-estra-1,3,5(10),8,14-pentaen - 17α - ol are prepared by the hydrogenation of racemic and d- and l-3-phenoxy-17α - hydroxy - estra - 1,3,5(10),8,14-pentaene, racemic and d- and l-3-tetrahydropyranyloxyestra - 1,3,5(10),8-tetraen-17α-ol are prepared by the hydrogenation of racemic and d- and l-3-tetrahydropyranyloxy - 17α-hydroxyestra - 1,3,5(10),8,14 - pentaene, racemic and d- and l-3-methoxy - 17α - acetoxyestra-1,3,5(10),8-tetraene are prepared by the hydrogenation of racemic and d- and l-3-methoxy - 17α - acetoxyestra-1,3,5(10),8,14-pentaene, racemic and d- and 1 - 3 - phenoxy - 17α - acetoxyestra-1,3,5(10),8-tetraene are prepared by the hydrogenation of racemic and d- and l-3-phenoxy - 17α - acetoxyestra - 1,3,5(10),8,14 - pentaene, racemic and d- and l-3-tetrahydropyranyloxy - 17α - acetoxyestra-1,3,5(10),8-tetraene are prepared by the hydrogenation of racemic and d- and l-3-tetrahydropyranyloxy - 17α - acetoxyestra-1,3,5(10),8,14-pentaene, racemic and d- and l-3,17α-dihydroxy-13-ethylgona-1,3,5(10),8-tetraene are prepared by the hydrogenation of racemic and d- and l-3,17α-dihydroxyl-13-ethylgona-1,3,5(10),8,14-pentaene, racemic and d- and l-3-methoxy - 13 - ethyl - 17α-hydroxygona - 1,3,5(10),8-tetraene are prepared by the hydrogenation of racemic and d- and l-3-methoxy - 13 - ethyl - 17α - hydroxygona-1,3,5(10),8,14-pentaene, racemic and d- and l-3-phenoxy-13-ethyl - 17α - hydroxygona - 1,3,5(10),8 - tetraene are prepared by the hydrogenation of racemic and d- and l-3-phenoxy - 13 - ethyl - 17α - hydroxygona - 1,3,5(10), 8,14-pentaene, and racemic and d- and l-3-tetrahydropyranyloxy - 13 - ethyl - 17α - hydroxygona - 1,3,5(10), 8-tetraene are prepared by the hydrogenation of racemic and d- and l-3-tetrahydro-pyranyloxy - 13 - ethyl - 17α-hydroxygona - 1,3,5(10),8,14-pentaene, racemic and d- and l-3-methoxy - 13 - ethyl - 17α - acetoxygona-1,3,5 (10),8-tetraene are prepared by the hydrogenation of racemic and d- and l-3-methoxy - 13 - ethyl - 17α-acetoxygona - 1,3,5(10),8,14 - pentaene, racemic and d- and l-3-phenoxy - 13 - ethyl - 17α - acetoxygona - 1,3,5(10), 8-tetraene are prepared by the hydrogenation of racemic and d- and l-3-phenoxy - 13 - ethyl - 17α - acetoxygona-1,3,5(10),8,14 - pentaene, and racemic and d- l-3-tetrahydropyranyloxy - 13 - ethyl - 17α - acetoxygona-1,3,5 (10),8-tetraene are prepared by the hydrogenation of racemic and d- and 1-3-tetrahydropyranyloxy-13-ethyl-17α-acetoxygona - 1,3,5(10),8,14 - pentaene.

EXAMPLE 13

Racemic and d- and l-3-methoxyestra-1,3,5(10),8-tetraen-17α-acetate

Four ml. of a 0.50 molar solution of 2,3-dimethyl-2-butyl borane in diethyleneglycol dimethyl ether is added dropwise over a period of 30 minutes to 560 mg. of each of racemic and d- and l-3-methoxy-17α-acetoxyestra - 1,3,5(10),8,14 - pentaene separately in solution in 2 ml. diethyleneglycol dimethyl ether. During the addition, the solutions are kept under nitrogen and maintained at a temperature of from 20–25° C. After the addition is complete, 300 mg. of propionic acid is added to each reaction mixture and the reaction mixtures are then refluxed for two hours. The reaction mixtures are cooled, 10 cc.'s of water are added to each, and each is extracted with ether. The ether extracts are washed with 5% aqueous sodium bicarbonate solution, washed with saturated aqueous sodium chloride solution, dried over magnesium sulfate, filtered and concentrated to dryness by distillation under reduced pressure. The residues are racemic and d- and l-3-methoxyestra-1,3,5(10),8-tetraen-17α-acetate and are purified by recrystallization from methanol.

In the same manner, racemic and d- and l-3-phenoxy-estra-1,3,5(10),8-tetraen - 17α - acetate are provided by the reduction of racemic and d- and l-3-phenoxy - 17α-acetoxyestra-1,3,5(10),8,14-pentaene, racemic and d- and l-3-tetrahydropyranyloxyestra - 1,3,5(10),8 - tetraen-17α-acetate are provided by the reduction of racemic and d- and l-3-tetrahydropyranyloxy - 17α- acetoxyestra-1,3, 5(10),8,14 - pentaene, racemic and d- and l-3-methoxy-13-ethylgona-1,3,5(10),8-tetraen - 17α- acetate are provided by the reduction of racemic and d- and l-3-methoxy-13-ethyl-17α-acetoxygona-1,3,5(10),8,14 - pentaene, racemic and d- and l-3-phenoxy - 13 - ethylgona-1,3,5(10),8-tetraen - 17α - acetate are provided by the reduction of racemic and d- and l-3-phenoxy - 13 - ethyl-17α-acetoxy-gona-1,3,5(10),8,14-pentaene, racemic and d- and l-3-tetrahydropyranyloxy - 13 - ethylgona-1,3,5(10),8-tetraen-17α-acetate are provided by the reduction of racemic and d- and l-3-tetrahydropyranyloxy-13-ethyl-17α - acetoxygona-1,3,5(10),8,14-pentaene.

EXAMPLE 14

Racemic and d- and l-3-methoxy-17α-hydroxyestra-1,3,5(10),8-tetraene 0.4 ml. of anhydrous hydrazine and 5 ml. of methanol containing 4 mg. of cupric acetate are added to separate stirred solutions of 200 mg. of racemic and d- and l-3-methoxy-17α - hydroxyestra - 1,3,5(10),8,14-pentaene in 30 ml. of ethyl acetate. The mixtures are stirred at 25° C. for 18 hours. Water is added to each and the mixtures are extracted with ethyl acetate. Each extract is washed with saturated salt solution, dried over magnesium sulfate and concentrated to dryness under vacuum. The residues are racemic and d- and l-3-methoxyestra-1,3,5(10),8-tetraen-17α-ol and are purified by chromatography on silica using a 40–1 chloroform-methanol solution as the developing solvent. The products are recovered by elution with a 1–1 acetone-methanol solvent.

In the same manner, racemic and d- and l-3,17α-dihydroxyestra-1,3,5(10),8-tetraene are prepared by the reduction of racemic and d- and l-3,17α-dihydroxyestra-1,3,5(10),8,14-pentaene, racemic and d- and l-3-phenoxyestra-1,3,5(10),8,14-pentaene-17α-ol are prepared by the reduction of racemic and d- and l-3-phenoxy-17α-hydroxyestra - 1,3,5(10),8,14 - pentaene, racemic d- and l-3-tetrahydropyranyloxyestra-1,3,5(10),8-tetraen-17α-ol are prepared by the reduction of racemic and d- and l-3-tetrahydropyranyloxy-17α-hydroxyestra-1,3,5(10),8,14-pentaene, racemic and d- and l-3-methoxy-17α-acetoxyestra-1,3,5(10),8-tetraene are prepared by the reduction of racemic and d- and 1,3-methoxy-17α-acetoxyestra - 1,3,5(10),8,14-pentaene, racemic and d- and l-3-phenoxy-17α-acetoxyestra-1,3,5(10),8-tetraene are prepared by the reduction of racemic and d- and l-3-phenoxy-17α-acetoxyestra-1,3,5(10),8,14-pentaene, racemic and d- and l-3-tetrahydropyranyloxy-17α-acetoxyestra-1,3,5-(10),8-tetraene are prepared by the reduction of racemic and d- and l-3-tetrahydropyranyloxy - 17α - acetoxyestra - 1,3,5(10),8,14-pentaene, racemic and d- and l-3,17α-dihydroxy-13-ethylgona-1,3,5(10),8-tetraene are prepared by the reduction of racemic and d- and l-3,17α-dihydroxy - 13 - ethylgona-1,3,5(10),8,14-pentaene, racemic and d- and l-3-methoxy-13-ethyl-17α-hydroxygona-1,3,5(10),8-tetraene are prepared by the reduction of racemic and d- and l-3-methoxy-13-ethyl-17α-hydroxygona-1,3,5(10),8,14-pentaene, racemic and d- and l-3-phenoxy-13-ethyl-17α-hydroxygona-1,3,5-(10),8-tetraene are prepared by the reduction of racemic and d- and l-3-phenoxy-13-ethyl-17α-hydroxygona-1,3,5-(10),8,14-pentaene, racemic and d- and l-3-tetrahydropyranyloxy-13-ethyl - 17α- hydroxygona-1,3,5(10),8-tetraene are prepared by the reduction of racemic and d- and l-3-tetrahydropyranyloxy-13-ethyl-17a-hydroxygona-1,3,5-(10),8,14-pentaene, racemic and d- and l-3-methoxy-13-ethyl-17α-acetoxygona-1,3,5(10),8-tetraene are prepared by the reduction of racemic and d- and l-3-methoxy-13-ethyl - 17α - acetoxygona-1,3,5(10),8,14-pentaene, racemic and d- and l-3-phenoxy-13-ethyl-17α-acetoxygona-1,3,5-(10),8-tetraene are prepared by the reduction of racemic and d- and l-3-phenoxy-13-ethyl-17α-acetoxygona-1,3,5-(10),8,14-pentaene, and racemic and d- and l-3-tetrahydropyranyloxy-13-ethyl-17α - acetoxygona-1,3,5(10),8-tetraene are prepared by the reduction of racemic and d- and l-3-tetrahydropyranyloxy-13-ethyl-17α-acetoxygona-1,3,5(10),8,14-pentaene.

EXAMPLE 15

Racemic and d- and l-3-methoxyestra-1,3,5(10)-trien-17α-ol

One gram of each of racemic and d- and l-3-methoxyestra-1,3,5(10),8-tetraen-17α-ol in solution in 100 ml. of tetrahydrofuran is added to a separate solution of 1.4 g. of potassium in 150 ml. of liquid ammonia. The reaction mixtures are stirred for one hour and ammonium acetate and water are then added to each. The reaction mixtures are each extracted with ether, the ether extracts are dried over magnesium sulfate and filtered. The solvent is removed from each of the filtrates by distillation under reduced pressure. The residues of racemic and d- and l-3-methoxyestra-1,3,5(10)-trien-17α-ol are each purified by chromatography on alumina.

In the same manner racemic and d- and l-3-phenoxyestra-1,3,5(10)-trien-17α-ol are prepared by the reduction of racemic and d- and l-3-phenoxyestra-1,3,5(10),8-tetraen-17α-ol, racemic and d- and l-3-tetrahydropyranyloxyestra-1,3,5(10)-trien-17α-ol are prepared by the reduction of racemic and d- and l-3-tetrahydropyranyloxyestra-1,3,5(10),8-tetraen-17α-ol, racemic and d- and l-3-methoxyestra-1,3,5(10)-trien-17α-ol are prepared by the reduction of racemic and d- and l - 3 - methoxyestra - 1,3,5(10),8-tetraen-17α-acetate, racemic and d- and l-3-phenoxyestra-1,3,5(10)-trien-17α-ol are prepared by the reduction of racemic and d- and l-3-phenoxyestra-1,3,5(10),8-tetraen-17α-acetate, racemic and d- and l-3-tetrahydropyranyloxyestra-l-3,5(10)-trien-17α-ol are prepared by the reduction of racemic and d- and l-3-tetrahydropyranyloxyestra-1,3,5-(10),8-tetraen-17α-acetate, racemic and d- and l-3-methoxy-13-ethylgona-1,3,5(10)-trien-17α-ol are prepared by the reduction of racemic and d- and l-3-methoxy-13-ethylgona-1,3,5(10),8-tetraen-17α-ol, racemic and d- and l-3-phenoxy-13-ethylgona-1,3,5(10)-trien-17α-ol are prepared by the reduction of racemic and d- and l-3-phenoxy-13-ethylgona-1,3,5(10),8-tetraen-17α-ol, racemic and d- and 1-3-tetrahydropyranyloxy - 13 - ethylgona-1,3,5(10)-trien-17α-ol are prepared by the reduction of racemic and d- and l-3-tetrahydropyranyloxy - 13 - ethylgona-1,3,5(10),8-tetraen-17α-ol, racemic and d- and l-3-methoxy-13-ethylgona-1,3,5(10)-trien-17α-ol are prepared by the reduction of racemic and d- and l-3-methoxy-13-ethylgona-1,3,5-(10),8-tetraen-17α-acetate, racemic and d- and l-3-phenoxy-13-ethylgona-1,3,5(10)-trien-17α-ol are prepared by the reduction of racemic and d- and l-3-phenoxy-13-ethylgona-1,3,5(10),8-tetraen-17α-acetate, racemic and d- and l-3-tetrahydropyranyloxy - 13 - ethylgona-1,3,5(10)-trien-17α-ol are prepared by the reduction of racemic and d- and 1-3-tetrahydropyranyloxy-13-ethylgona-1,3,5(10),8-tetraen-17α-acetate.

EXAMPLE 16

Racemic and d- and l-3-methoxyestra-1,3,5(10)-trien-17-one

Solutions of 282 mg. of each of racemic and d- and l-3-methoxyestra-1,3,5(10)-trien-17α-ol in 10 ml. of glacial acetic acid containing 99 mg. of sodium dichromate are kept at 25° C. for six hours. Water is added to each solution and the reaction mixtures are each extracted with chloroform. The chloroform extracts are each washed with 5% aqueous potassium bicarbonate solution, washed with saturated aqueous sodium chloride solution, dried over magnesium sulfate, filtered and concentrated to dryness under reduced pressure. The residues are racemic and d- and l-3-methoxyestra-1,3,5(10)-trien-17-one and are obtained in crystalline form by trituration with methanol. The products may be recrystallized from methanol.

In the same manner racemic and d- and l-3-phenoxyestra-1,3,5(10)-trien-17-one are produced by the oxidation of racemic and d- and l-3-phenoxyestra-1,3,5(10)-trien-17α-ol, racemic and d- and l-3-tetrahydropyranyloxyestra-1,3,5(10)-trien-17-one are produced by the oxidation of racemic and d- and l-3-tetrahydropyranyloxyestra-1,3,5(10)-trien-17α-ol, racemic and d- and l-3-methoxy-13-ethylgona-1,3,5(10)-trien-17-one are produced by the oxidation of racemic and d- and 1-3-methoxy-13-ethylgona-1,3,5(10)-trien-17α-ol, racemic and d- and l-3-phenoxy-13-ethylgona-1,3,5(10)-trien-17-one are produced by the oxidation of racemic and d- and l-3-phenoxy-13-ethylgona-1,3,5(10)-trien-17α-ol, racemic and d- and l-3-tetrahydropyranyloxy-13-ethylgona-1,3,5(10)-trien-17-one are produced by the oxidation of racemic and d- and l-3-tetrahydropyranyloxy-13-ethylgona-1,3,5(10)-trien-17α-ol.

EXAMPLE 17 d- and l-3-methoxyestra-1,3,5(10)-trien-17-one

Solution of 255 mg. of each of 3- and l-3-methoxyestra-1,3,5(10)-trien-17α-ol, 306 mg. of freshly distilled aluminum isopropoxide and 13 ml. of dry toluene are heated for five minutes on a steam bath under an atmosphere of nitrogen. The solutions are cooled to 25° and 2.6 ml. of distilled cyclohexanone are added to each. The solutions are again heated on the steam bath under nitrogen for 40 minutes and then cooled in ice. A saturated aqueous solution of Rochelle salts is added with vigorous shaking to each solution and the products are each extracted with ether. The ether is removed by evaporation from each and the remaining solutions are steam distilled. The residues are each extracted with ether and the ether solutions are dried over magnesium sulfate, filtered and evaporated to dryness. The residues are racemic and d- and l-3-methoxyestra-1,3,5(10)-trien-17-one and may be purified by recrystallization from methanol.

In the same manner racemic and d- and l-3-phenoxyestra-1,3,5(10)-trien-17-one and racemic and d- and l-3-tetrahydropyranyloxyestra-1,3,5(10)-trien-17-one are produced by the oxidation of racemic and d- and l-3-phenoxyestra-1,3,5(10)-trien-17α-ol and racemic and d- and 1 - 3 - tetrahydropyranyloxyestra-1,3,5(10)-trien-17α-ol, racemic and d- and l-3-methoxy-13-ethylgona-1,3,5(10)-trien-17-one are produced by the oxidation of racemic and d- and 1-3-methoxy-13-ethylgona-1,3,5(10)-trien-17α - ol, racemic and d- and 1 - 3-phenoxy-13-ethylgona-1,3,5(10)-trien-17-one are produced by the oxidation of racemic and d- and l-3-phenoxy-13-ethylgona-1,3,5(10)-trien-17α-ol, racemic and d- and l-3-tetrahydropyranyloxy-13-ethylgona - 1,3,5(10) - trien - 17 - one are produced by the oxidation of racemic and d- and l-3-tetrahydropyranyloxy-13-ethylgona-1,3,5(10)-trien-17α-ol.

Various changes and modifications may be made in carrying out the present invention without departing from the spirit and scope thereof. Insofar as these changes and modifications are within the purview of the annexed claims, they are to be considered as part of our invention.

What is claimed is:
1. The racemic form and the optically active d- and l-isomers of a compound of the formula:

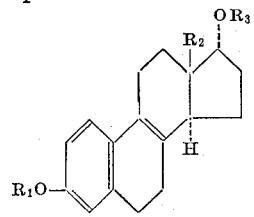

wherein $R_1$ is hydrogen, a lower cycloaliphatic radical or a straight or branch-chained lower alkyl radical, and aryl, or a tetrahydropyranyl radical; $R_2$ is a lower polycarbonalkyl radical, and $R_3$ is hydrogen or a lower acyl radical.

2. A compound according to claim 1 in which $R_1$ is a methyl group.

References Cited

UNITED STATES PATENTS

| | | | |
|---|---|---|---|
| 3,210,388 | 10/1965 | Knox | 260—397.3 |
| 3,318,922 | 5/1967 | Windholz et al. | 260—397.4 |
| 3,325,481 | 6/1967 | Pappo | 260—239.5 |
| 3,344,038 | 9/1967 | Greenspan et al. | 195—51 |

OTHER REFERENCES

Fieser et al. Steroids pp. 465–67 (1959).
Djerassi—Steroid Reactions pp. 94 and 146 (1963).
Finar—Organic Chemistry vol. II, pp. 61–63 (1959).

HENRY A. FRENCH, Primary Examiner

U.S. Cl. X.R.

260—239.55, 345.9, 397.4, 590, 999